(12) United States Patent
Batke et al.

(10) Patent No.: US 8,041,840 B2
(45) Date of Patent: Oct. 18, 2011

(54) INDUSTRIAL CONTROL SYSTEM WITH AUTONOMOUS WEB SERVER

(75) Inventors: Brian A. Batke, Novelty, OH (US); Scot A. Tutkovics, Sagamore Hills, OH (US); Gary W. Baczkowski, Seven Hills, OH (US); Kenwood H. Hall, Hudson, OH (US); David A. Vasko, Macedonia, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2958 days.

(21) Appl. No.: 09/967,307

(22) Filed: Sep. 28, 2001

(65) Prior Publication Data

US 2002/0156926 A1 Oct. 24, 2002

Related U.S. Application Data

(60) Provisional application No. 60/285,177, filed on Apr. 20, 2001.

(51) Int. Cl.
*G06F 15/16* (2006.01)

(52) U.S. Cl. ............... 709/250; 709/200; 700/83

(58) Field of Classification Search ............ 709/250, 709/218, 224, 200; 700/83
See application file for complete search history.

(56) References Cited

U.S. PATENT DOCUMENTS

| | | | | |
|---|---|---|---|---|
| 6,061,603 | A * | 5/2000 | Papadopoulos et al. | 700/83 |
| 6,484,061 | B2 * | 11/2002 | Papadopoulos et al. | 700/83 |
| 6,542,925 | B2 * | 4/2003 | Brown et al. | 709/208 |
| 6,640,140 | B1 * | 10/2003 | Lindner et al. | 700/18 |
| 6,799,077 | B1 * | 9/2004 | Hauet | 700/2 |

FOREIGN PATENT DOCUMENTS

| | | | |
|---|---|---|---|
| JP | 10-011325 | * | 1/1998 |
| JP | 10011325 A | * | 1/1998 |

* cited by examiner

*Primary Examiner* — Ario Etienne
*Assistant Examiner* — El Hadji Sall
(74) *Attorney, Agent, or Firm* — Boyle Fredrickson LLP; R. Scott Speroff; John M. Miller

(57) ABSTRACT

An autonomous Web server may be connected to an industrial control system to provide direct access to input and output points through connections between the Web server and the input and output points. Coordination with the programmable logic controller is implemented through a set of lock flags which prevent conflicts either between multiple Web connections or between Web connections and the control produced by the programmable logic controller.

22 Claims, 2 Drawing Sheets

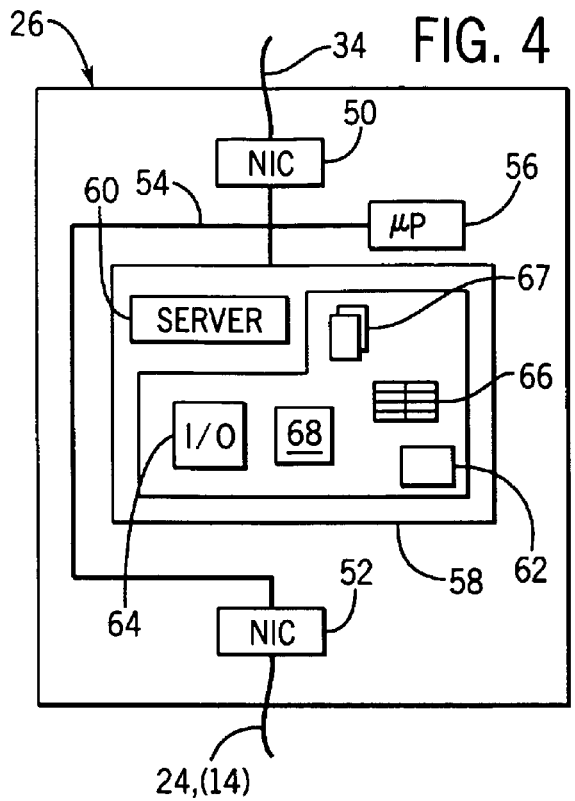
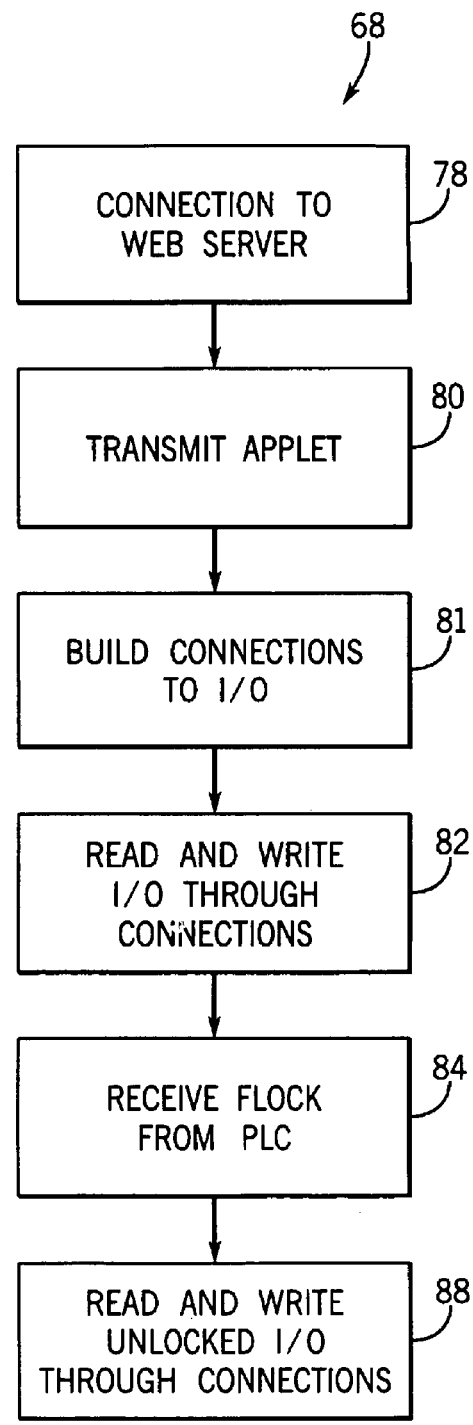

INDUSTRIAL CONTROL SYSTEM WITH AUTONOMOUS WEB SERVER

CROSS-REFERENCE TO RELATED APPLICATIONS

This application claims the benefit of U.S. provisional patent application Ser. No. 60/285,177, filed on Apr. 20, 2001.

STATEMENT REGARDING FEDERALLY SPONSORED RESEARCH OR DEVELOPMENT

BACKGROUND OF THE INVENTION

The present invention relates to industrial controller systems used for real-time control of industrial processes, and in particular to an interface module for use with such industrial controller systems providing direct access to input and output points of the control system over the World Wide Web.

Industrial control systems are special purpose computer systems used in controlling industrial processes. Under the direction of a stored control program, a programmable logic controller, being part of the industrial control system, reads inputs from a series of input modules and writes outputs to a series of output modules. The input modules read signals from sensors associated with the industrial process and the output modules provide signals to actuators and the like in the industrial process. The inputs and outputs may be binary, that is on or off or analog, providing a value with a continuous range such as, for the case of inputs, from an analog to digital converter or an encoder.

Industrial control systems differ from conventional computer systems in that they provide highly reliable operation and deterministic real-time control. In part, this requires both that data communicated between the programmable logic controller and the input and output modules be transmitted in a predictable sequence. This may be provided by use of an I/O image table which is populated with complete sets of input or output data before control decisions are made and before outputs are forwarded to the I/O modules.

It is also necessary that data be reliably transmitted between the programmable logic controller and the I/O modules within predictable and short time limits. One way this may be provided by using a network supporting "connected messaging". In connected messaging, communicating devices of the system establish a "connection" prior to the transmission of data. The process of establishing the connection reserves the necessary network bandwidth, buffer space, and other network resources on the end nodes and along the way between them via connecting media and intervening devices such as bridges, or routers. When messages are sent, reliable transmission can thereby be assured.

A number of connected messaging systems are well known in the art including Control Net, a network supported by the Allen-Bradley division of Rockwell, as well as DeviceNet and a number of other well known networks.

An important component of an industrial control system is the human machine interface (HMI) which allows, testing, troubleshooting and monitoring of the industrial process. Typically HMIs read and write to the I/O image table of the programmable logic controller under the operation of the control program.

Often it is desired to monitor an industrial process remotely. The development of the Internet and the Web has raised the possibility of using well known remote communication techniques with Web servers and browsers to implement a remote HMI that could be used on any browser enabled computer. Current proposals for providing Web to an industrial control system envision a Web server module that may plug into a common backplane to communicate with the programmable logic controller. Input and output data is communicated between the I/O module and the programmable logic controller and selectively communicated, under the control of the programmable logic controller, between the programmable logic controller and the Web server module.

BRIEF SUMMARY OF THE INVENTION

The present invention provides a Web server module for an industrial control system that may communicate directly with the I/O modules without the intervention of the programmable logic controller. In the preferred embodiment, this is done by the Web server module opening its own connections with the I/O modules independent of the connections opened by the programmable logic controller.

This approach yields two important benefits. First it allows a Web-based HMI to be used during the initial set up and troubleshooting of the industrial control system prior to the time when the programmable logic controller is fully operational. By the same token, the Web-based HMI can provide some control capabilities upon rare instances of failure of the programmable logic controller. Second, after the industrial control system is fully operational, the Web-based HMI of the present invention provides rapid access to I/O data without burdening the programmable logic controller and unfettered by possible execution time restraints of the programmable logic controller.

A potential conflict in different commands from these two sources of direct communication with I/O (the programmable logic controller and the Web-based HMI) is avoided by a write disable command that may be sent to the Web server interface from the programmable logic controller, after the latter is enabled, to selectively prevent output data from coming from the Web.

Specifically, then, the present invention provides a Web interface module for an industrial control system including a programmable logic controller for executing an industrial control program. The programmable logic controller communicates over a controller network with I/O modules and the I/O modules send and receive electrical signals to and from an industrial process. The Web interface module includes an Internet interface for connecting to a Web accessing communications medium, a network interface for connecting to the controller network, and a processing unit executing a stored program to communicate directly with at least one I/O module and to pass data between the Web accessing communications medium and the I/O module.

Thus it is one object of the invention to provide for a Web interface that may operate to control I/O points and read data from those I/O points without the intervention of a programmable logic controller.

The processing unit also executes the stored program to receive a write disable command from the programmable logic controller causing the stored program to allow direct reading of data from the I/O module but not direct writing of data to the I/O module.

It is thus another object of the invention to provide for an autonomous Web server interface to the programmable logic controller without danger of disruption of the control process from unsynchronized control data received over the Web.

The network interface may connect to a connected messaging network and a processing unit of the interface, executing a stored program, may open connections on the connected messaging network between at least one I/O module and the Web interface module to pass data between the Web accessing communications medium and the I/O module. A connection may be opened between the Web interface module and the programmable logic controller and both this connection and the one between the I/O module and the Web interface may share the same messages.

Thus it is another object of the invention to provide a simple mechanism to realize a direct connection between a Web interface module and I/O modules that also allows an efficient connection between the Web interface module and the programmable logic controller.

The processing unit may open connections on the connected messaging network with a plurality of I/O modules and may include an I/O image table. The passing of data between the Web accessing communications medium and the I/O module may separately read and write data between the Web accessing communications medium and the I/O image table, and between the I/O modules and the I/O image table.

Thus it is another object of the invention to provide the Web server with the capability of accumulating asynchronous data transfers over the Web into a block for robust transmission to I/O points to avoid race conditions and unexpected network behavior.

The connected messaging network may be a parallel backplane between the Web interface module and the programmable logic controller and a serial network between the backplane and the I/O modules.

Thus it is another object of the invention to allow the Web module to be freely configured in the control system not necessarily in the backplane or in the chassis holding the programmable logic controller.

The foregoing objects and advantages may not apply to all embodiments of the inventions and are not intended to define the scope of the invention for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

BRIEF DESCRIPTION OF THE DRAWINGS

FIG. 4 is a block diagram of the Web server of the present invention showing contained memory for holding the server programming, I/O table, one or more Web pages, and a flag set for the various I/O points;

FIG. 5 is a table showing the flag set for allowing selectively writing to particular output points as well as an MLOCK and FLOCK flag which lock this resource against possible conflicting Web requests; and FIG. 6 is a flow chart of the process of using the Web server of the present invention.

DETAILED DESCRIPTION OF THE PREFERRED EMBODIMENT

Figure 1:
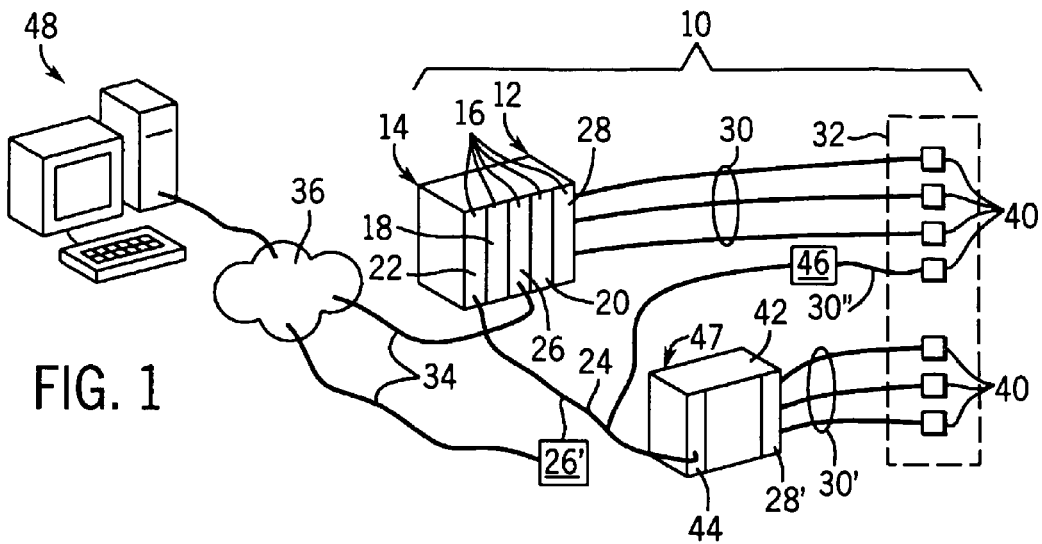
FIG. 1 is a simplified perspective view of a control system such as may be used with the present invention showing an Internet connected browser-enabled PC communicating in a variety of different modes with a programmable controller through a Web interface of the present invention further showing a programmable logic controller communicating directly with a control process through a contained I/O module and remotely with I/O modules contained in a remote chassis or independently I/O nodes through a connected messaging link.

Referring now to FIG. 1, an industrial control system 10 includes generally a rack 12 having a backplane 14 into which a variety of modules 16 may be connected. The modules 16 connect to the backplane 14 using releasable electrical connectors (not shown) so as to allow for different configurations of the control system to match the demands of the control application.

The modules 16 may include a programmable logic controller 18, such as may execute a control program typically in function block language or relay ladder logic language or another common control language. Also included among the modules are a power supply 20 for providing power to the various modules 16 (which may alternately be an integral part of the rack 12), a network interface 22 for communication with an industrial control network 24, the Web server module 26 of the present invention and an I/O module 28 communicating via input and output lines 30 with actuators and sensors 40 of an industrial process 32.

The industrial control network 24 may communicate with a remote I/O rack 42 having a second network interface 44. The remote I/O rack 42 may also include a backplane 47 which communicates with one or more I/O modules 28' having input and output lines 30' also communicating with actuators and sensors 40' within the industrial process 32.

The industrial control network 24 may also communicate with a free-standing I/O module 46 also communicating with actuators and sensors 40 of the industrial process 32 via input and output lines 30".

Generally the network provides for a connected messaging system such as is found with ControlNet or DeviceNet.

The Web server module 26 connects to Web media 34 (such as an EtherNet cable, a standard copper phone line, a fiber optic line or a wireless system, such as are all well known in the art) which in turn connects to the Internet 36. As such, the Web server module 26 provides an Internet interface, meaning that it uses the TCP/IP Protocol Suite, and thus can communicate with other devices following this protocol. The Internet 36 may provide a path to connect to a variety of remote terminal devices 48 such as a personal computer having a modem and executing an operating system to run a conventional browser such as Netscape Navigator commercially available from Netscape Communications of Mountain View, Calif., or Microsoft Internet Explorer commercially available from Microsoft Corporation of Redmond, Wash. Such browsers are well known in the art and operate to receive hypertext markup language (HTML) documents transmitted in the TCP/IP Internet protocol from a Web server to display data in predefined graphic formats. Browsers may also include a Java Virtual Machine (JVM) to permit the downloading of Java applets such as in Java, a standard promulgated by Sun Microsystems of Palo Alto, Calif. The remote terminal device 48 may also include other browser-enabled systems including so-called palmtop devices or Internet enabled cellular telephones and the like connected via wireless media to the Internet 36.

Figure 2:
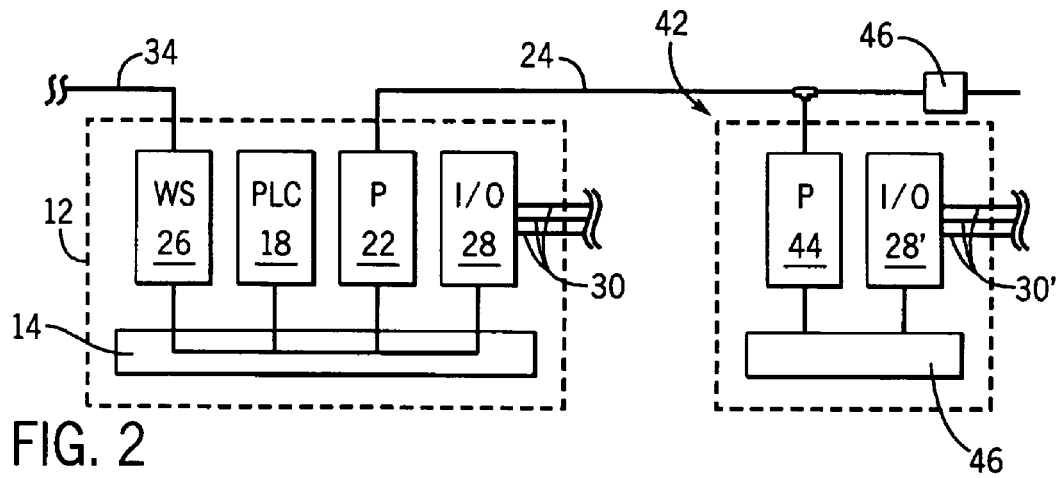
FIG. 2 is a block diagram of one implementation of a control system of FIG. 1 having a Web server connected on a common backplane within a rack to a programmable logic controller, I/O modules, and a serial network which may be connected to a remote I/O rack or individual I/O nodes.

Referring now also to FIG. 2, in a first embodiment of the invention, the Web server module 26 may connect via backplane 14 to network interface 22 to communicate directly through the industrial control network 24 with various I/O points. This communication may be conducted using a connected messaging protocol in which connections are established directly between the Web server module 26 and the various I/O modules 46, 28' and 28. Under the connected messaging system, the backplane 14 and the industrial control network 24 act as a logical single network.

Referring now to FIG. 4, the Web server module 26 uses a first network interface chip 50 to communicate with the Web media 34 and a second network interface chip 52 communication with the industrial network of the backplane 14. The two interface chips 50 and 52 may connect via an internal bus 54 to a microprocessor 56 and memory 58 which serve together with firmware of the interface chips 50 and 52 themselves, to effect protocols necessary for communications with the Web media 34 and the industrial control network 24 according to methods well known in the art.

The memory 58 may be a combination of randomly accessed memory (RAM) and read only memory (ROM) and stores an operating system such as Linux (not shown) distributed by Redhat Software of Durham N.C., a Web server program 60 (for example the Apache Web server (also distributed by Redhat Software) such as provides for the ability to implement server side hypertext transfer protocol (http) using the microprocessor 56 and RAM 62.

The memory 58 may also include an I/O image table 64 such as provides a mapping of all I/O data input from or output to the I/O modules 28, 28' and 46 (or a subset thereof).

The memory 58 may also include one or more Web pages 67 such as may contain embedded Java script applets as will be described and such as may be downloaded to browsers on the remote terminal devices 48 connecting to the Web server of the Web server module 26. Java language compilers are distributed by Sun Microsystems.

The memory 58 may also include the Web interface application program 68 and a flag table 66 which provides for implementation of features of the present invention as will now be described.

Referring now to FIGS. 1, 4 and 5, the application program 68 and flag table 66 work in conjunction to allow direct communication between multiple remote terminal devices 48 and the I/O modules 28, 28' and 46 without intervention of the programmable logic controller 18 and without conflict or disruption to the control process, despite the lack of determinacy and reliability of Web communications. In this regard, the flag table 66 generally provides a series of flags 70 and 76, each depicted in a different row, each row for flags 70 identifying a flag state as set or reset together with a particular output 72 corresponding to the flag 70 and being by an output of an I/O module 28, 28' or 46.

The state of the flags 70 may be set or reset by instructions from the programmable logic controller 18 communicating with the Web server module 26 over the backplane 14 via a connection opened by the programmable logic controller 18. If the programmable logic controller 18 is not operating, the Web server module 26 is free to write to all outputs, as the flags 70 are initialized in the reset mode. This lockout of writing is effected by the application program 68.

The flag lock (FLOCK) flag 76 prevents conflicts between different remote terminal devices 48 which may be simultaneously communicating with the Web server module 26. When the FLOCK flag 76 is set, the applet programs in the browsers of the remote terminal devices 48 block information from being sent to an output I/O module 28, 28' or 46 from that remote terminal devices 48. A user at a given remote terminal device 48 interested in changing outputs of the industrial control system 10 thus causes the transmission of a message from the remote terminal device 48 to the Web server module 26 first reading the FLOCK flag 76. If the FLOCK flag 76 is already set, the remote terminal device 48 must wait (spin) until it is reset. Once the FLOCK flag 76 is read as reset, the remote terminal device 48 sets the FLOCK flag 76 to prevent changes of the flags (and ultimately outputs) by other users on different remote terminal devices 48 and may send outputs to those outputs whose flags 70 are not set.

Referring now to FIGS. 1 and 6, the application program 68 as a first step accepts a connection to the Web server module 26 from a remote terminal device 48 as indicated by process block 78. This process involves generally following standard Web protocol for receiving the request directed to the URL of the Web server.

At succeeding process block 80, a Web page 67 is transmitted to the browser of the connected remote terminal device 48 including a Java applet that provides for the protocols described above with respect to the FLOCK flag 76 described above and which provides input and output control commands that may be interpreted by the application program 68 for changing I/O values and which provides for a browser-type graphical user interface.

At process block 81, connections to I/O may be built between the Web server and the I/O modules 28, 28, and 46 using the standard connection opening process implemented according to the protocol of the industrial control network 24. These connections may be initiated by commands from the remote terminal device and provide for a producer and a consumer at each of the Web server and I/O modules. Messages denoting input signals produced by the I/O modules as producers may be shared with the consumers of the programmable logic controller 18 and messages denoting output signals produced by the programmable logic controller 18 as a producer may be shared with the consumers of the I/O modules, thus reducing extra network traffic that might otherwise be attributable to the Web connection.

Alternatively, connections may be initiated through another conventional mechanism, such as by a dedicated programming terminal, and commands from the remote terminal device 48 may instruct the application program to expose these preexisting connections to the applet in the remote terminal device 48.

At process block 82, reading and writing between the Web server and I/O points may commence under the instruction of the browser executing the applet, following the procedure of interrogating the locks 70 as described above. Generally, each reading and writing by a Web client, will be preceded by the Web client setting of the FLOCK flag 76 and concluded by resetting of the FLOCK flag 76 so as to prevent conflicts between two Web clients such as may create ambiguity when operations must be executed atomically (i.e. without interruption). These steps may occur without intervention or even existence of a programmable logic controller.

At process block 84, a connection may be opened by the programmable logic controller 18 indicating that it is activated and setting or resetting various of the flags 70 as may be appropriate for the controlled process to lock out changes from remote terminal devices 48.

At process block 88, reading and writing two I/O points that have a reset flag 70 may continue to occur through the browser.

Referring again to FIG. 2 in the embodiment described, the programmable logic controller 18 may communicate with the Web server module 26 over the backplane 14 while the Web server module 26 communicates directly with the I/O modules 28, 28' and 46 via the backplane 14, the network interface 22, and the industrial control network 24.

Figure 3:
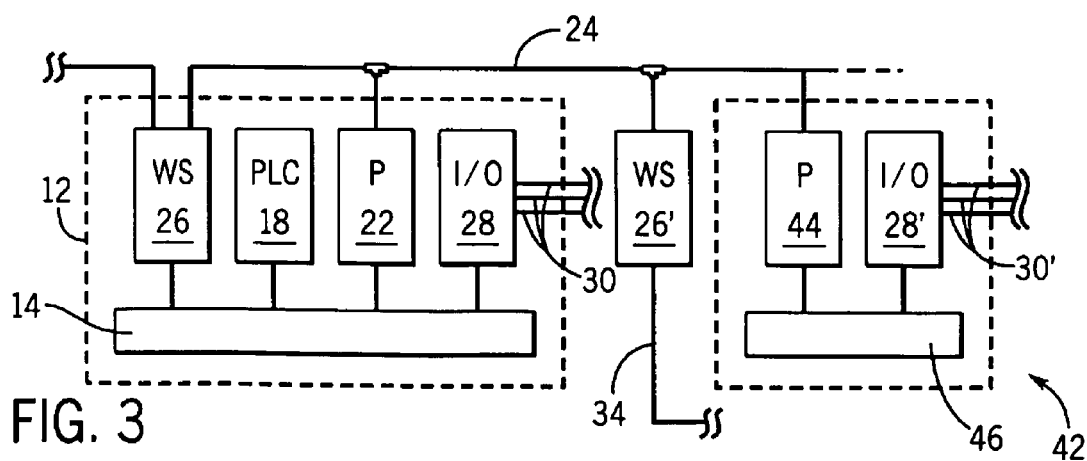
FIG. 3 is a figure similar to that of FIG. 2 showing an alternative embodiment in which the Web server communicates with the I/O modules directly on the serial link either as contained with the rack or external to the rack.

Referring then to FIG. 3, in an alternative embodiment, the Web server module 26 may communicate directly with the industrial control network 24. In this case, the Web server module 26 need not connect to the backplane 14; however, such a backplane connection may be allowed. Thus, the Web server module 26 may communicate with a programmable logic controller 18 either directly through the backplane 14 or through the industrial control network 24 backward through the network interface 22 to the backplane 14.

Referring to FIGS. 1 and 3, in an alternative embodiment, the Web server module 26 may be located outside of the rack 12 at a location as indicated by number 26' attached simply to the industrial control network 24. This ability for the Web server to be freely placed at any point in the industrial control system 10 may in fact allow the Web server to be placed in an I/O module or as a separate node on the industrial control network 24 and to be easily retrofit into existing control systems.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A Web interface module for an industrial control system including a programmable logic controller for executing an industrial control program, the programmable logic controller communicating over a controller network with I/O modules, the I/O modules sending and receiving electrical signals to and from an industrial process, the Web interface module comprising;
    an Internet interface for connecting to a Web accessing communications medium;
    a network interface for connecting to the controller network; and
    a processing unit executing a stored program to communicate directly with at least one I/O module and to pass data between the Web accessing communications medium and the I/O module, the passing of data including the writing of data to the I/O modules defining the electrical signals to be sent by the I/O module to the industrial process and the reading of data from the I/O modules defined by electrical signals received by the I/O modules from the industrial process;
    whereby communications may be had with the I/O module without intervention of the programmable logic controller.

2. The Web interface module of claim 1 wherein the processing unit also executes the stored program to receive a write disable command from the programmable logic controller causing the stored program to allow direct reading of data from the I/O module but not direct writing of data to the I/O module;
    whereby conflicting writing of data to the I/O module is prevented.

3. The Web interface module of claim 1 wherein the network interface provides a connected messaging protocol.

4. The Web interface module of claim 1 wherein the processing unit executing the stored program also opens at least one connection on the connected messaging network between the programmable logic controller and the Web interface to transfer data between the programmable logic controller and the interface.

5. The Web interface module of claim 1 wherein the connected messaging network is selected from the group consisting of Control Net, DeviceNet and EtherNet.

6. The Web interface module of claim 1 wherein the Web accessing communications medium is selected from the group consisting of a wire cable, a fiber optic cable, and a radio link.

7. The Web interface module of claim 1 wherein the processing unit executing the stored program opens connections on the connected messaging network with a plurality of I/O modules and wherein the processing unit includes an I/O image table and wherein the passing of data between the Web accessing communications medium and the I/O module separately reads and writes data between the Web accessing communications medium the I/O image table, and between the I/O modules and the I/O image table;
    where the transfer of data between the Web accessing communications medium and the I/O is implemented through the I/O image table.

8. The Web interface module of claim 7 wherein the processing unit executing the stored program reads and writes data between the I/O image table and the I/O modules in a predetermined order.

9. The Web interface module of claim 1 wherein the connected messaging network comprises a parallel backplane between the Web interface module and the programmable logic controller and a serial network between the backplane and the I/O modules.

10. The Web interface module of claim 9 wherein the network interface of the Web interface module attaches to the backplane.

11. The Web interface module of claim 9 wherein the network interface of the Web interface module attaches to the serial network.

12. An industrial control system for an industrial control system comprising:
    a plurality of I/O modules sending and receiving electrical signals to and from an industrial process;
    a controller network communicating with the I/O modules;
    a programmable logic controller attachable to the controller network to execute a stored control program to exchange data with the I/O modules over the controller network to control the industrial process; and
    a Web interface module including:
    (a) an Internet interface for connecting to a Web accessing communications medium;
    (b) a network interface for connecting to the controller network; and
    (c) a processing unit executing a stored interface program to communicate directly with at least one I/O module and to pass data between the Web accessing communications medium and the I/O module, the passing of data including the writing of data to the I/O modules defining the electrical signals to be sent by the I/O module to the industrial process and the reading of data from the I/O modules defined by electrical signals received by the I/O modules from the industrial process;
    whereby communications may be had with the I/O module without intervention of the programmable logic controller.

13. The industrial control system of claim 12 wherein the processing unit also executes the stored program to receive a write disable command from the programmable logic controller causing the stored interface program to allow direct reading of data from the I/O module but not direct writing of data to the I/O module;
  whereby conflicting writing of data to the I/O module is prevented.

14. An industrial control system comprising:
  a plurality of I/O modules sending and receiving electrical signals to and from an industrial process;
  a connected messaging network communicating with the I/O modules;
  a programmable logic controller attachable to the controller network to execute a stored control program to open connections and exchange data with the I/O modules over the connected messaging network to control the industrial process; and
  a Web interface module including:
  (a) an Internet interface for connecting to a Web accessing communications medium;
  (b) a network interface for connecting to the connected messaging network; and
  (c) a processing unit executing a stored interface program to open connections on the connected messaging network between at least one I/O module and the Web interface module and to pass data between the Web accessing communications medium and the I/O module the passing of data including the writing of data to the I/O modules defining the electrical signals to be sent by the I/O module to the industrial process and the reading of data from the I/O modules defined by electrical signals received by the I/O modules from the industrial process;
  whereby communications may be had with the I/O module without intervention of the programmable logic controller.

15. The industrial control system of claim 14 wherein the processing unit executing the stored interface program also opens at least one connection on the connected messaging network between the programmable logic controller and the Web interface to transfer data between the programmable logic controller and the interface.

16. The industrial control system of claim 14 wherein the connected messaging network is selected from the group consisting of ControlNet, DeviceNet, and EtherNet.

17. The industrial control system of claim 14 wherein the Web accessing communications medium is selected from the group consisting of a wire cable, a fiber optic cable, and a radio link.

18. The industrial control system of claim 14 wherein the processing unit executing the stored interface program opens connections on the connected messaging network with a plurality of I/O modules and wherein the processing unit includes an I/O image table and wherein the passing of data between the Web accessing communications medium and the I/O module separately reads and writes data between the Web accessing communications medium and the I/O image table, and between the I/O modules and the I/O image table;
  where the transfer of data between the Web accessing communications medium and the I/O is implemented through the I/O image table.

19. The industrial control system of claim 18 wherein the processing unit executing the stored interface program reads and writes data between the I/O image table and the I/O modules in a predetermined order.

20. The industrial control system of claim 14 wherein the connected messaging network comprises a parallel backplane between Web interface module and the programmable logic controller and a serial network between the backplane and the I/O modules.

21. The industrial control system of claim 20 wherein the network interface of the Web interface module attaches to the backplane.

22. The industrial control system of claim 14 wherein the network interface of the Web interface module attaches to the serial network.

* * * * *